(12) United States Patent
Lee et al.

(10) Patent No.: US 8,273,272 B2
(45) Date of Patent: Sep. 25, 2012

(54) METHOD FOR MANUFACTURING LENS USED IN CAMERA MODULE

(75) Inventors: Cheong Hee Lee, Suwon-si (KR); Jong Ho Ahn, Yongin-si (KR); In Cheol Chang, Seongnam-si (KR); Hye Ran Oh, Hwaseong-si (KR); Seok Cheon Lee, Suwon-si (KR); Young Su Jin, Yongin-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 289 days.

(21) Appl. No.: 12/654,755

(22) Filed: Dec. 30, 2009

(65) Prior Publication Data

US 2011/0101551 A1    May 5, 2011

(30) Foreign Application Priority Data

Nov. 3, 2009 (KR) .................. 10-2009-0105479

(51) Int. Cl.
   *B29D 11/00* (2006.01)

(52) U.S. Cl. .......... 264/1.36; 264/2.5; 264/2.7; 425/808

(58) Field of Classification Search ............... 264/1.36, 264/1.38, 1.7, 2.7, 2.5; 425/808
See application file for complete search history.

(56) References Cited

U.S. PATENT DOCUMENTS

| | | | |
|---|---|---|---|
| 6,693,748 B1 * | 2/2004 | Fujimoto et al. | 359/621 |
| 2006/0220268 A1 | 10/2006 | Chao et al. | |
| 2009/0315200 A1 * | 12/2009 | Lin | 264/1.36 |

FOREIGN PATENT DOCUMENTS

| | | |
|---|---|---|
| JP | 10-138356 | 5/1998 |
| JP | 2004-163695 | 6/2004 |

OTHER PUBLICATIONS

Korean Office Action dated May 25, 2011 issued in corresponding Korean Patent Application No. 10-2009-0105479.
Korean Office Action dated Dec. 28, 2011 issued in corresponding Korean Patent Application No. 10-2009-0105479.

* cited by examiner

*Primary Examiner* — Mathieu D. Vargot

(57) ABSTRACT

The present invention provides a method for manufacturing a lens used in a camera module including the steps of: preparing a preform for manufacturing a lens; forming a front lens on a front surface of the preform; and forming an array lens by forming a rear lens on a rear surface of the preform during the formation of the front lens.

12 Claims, 2 Drawing Sheets

[FIG. 1]
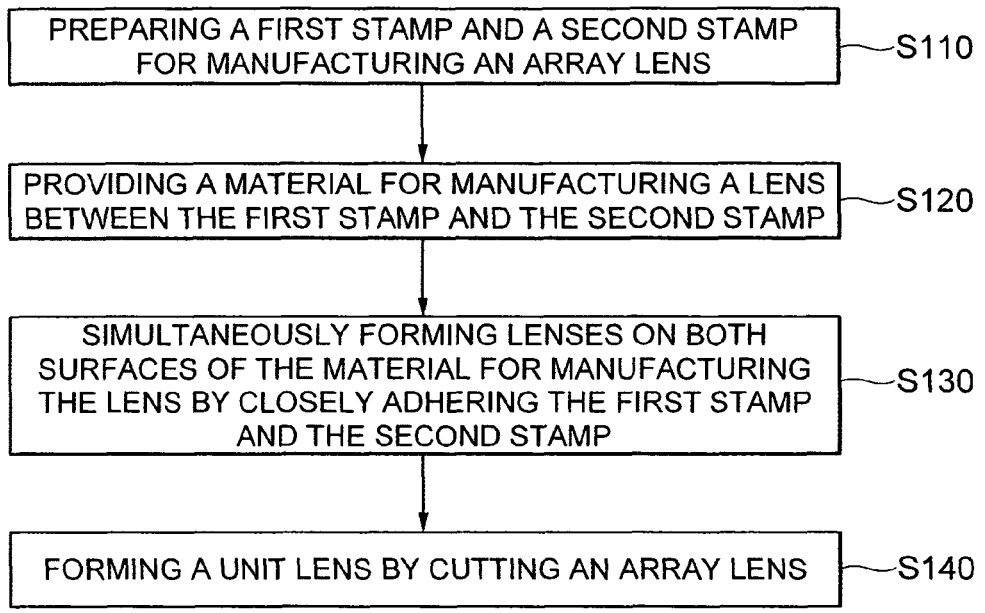
[FIG. 2]
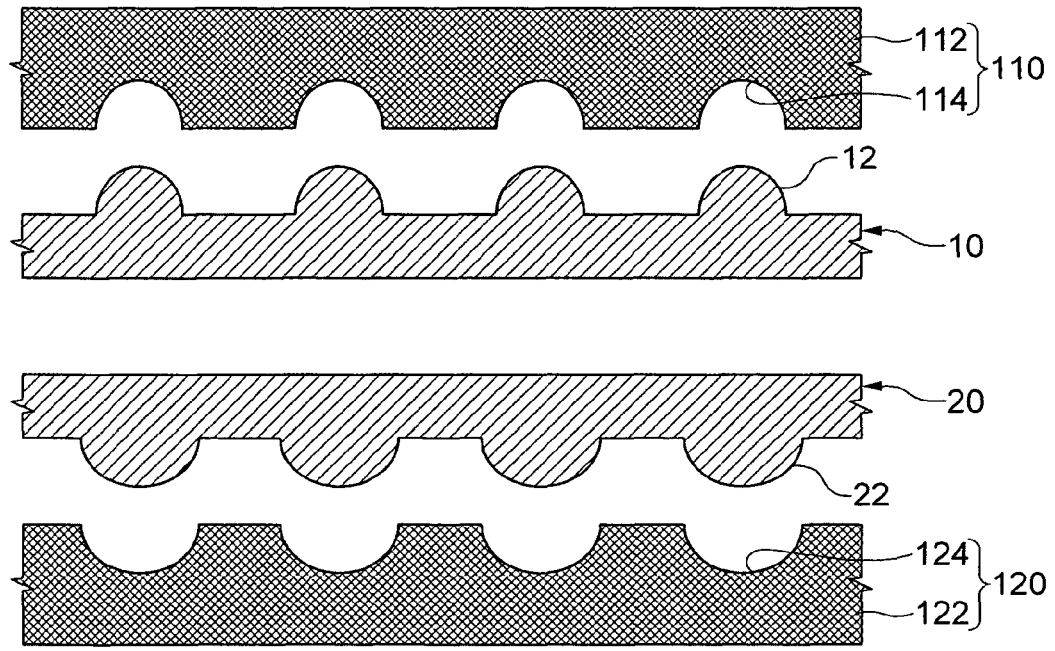

[FIG. 3]
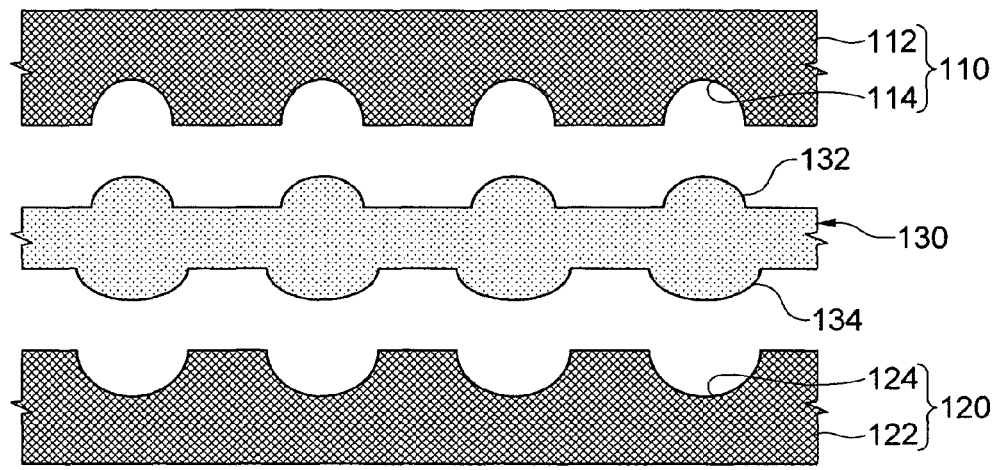
[FIG. 4]
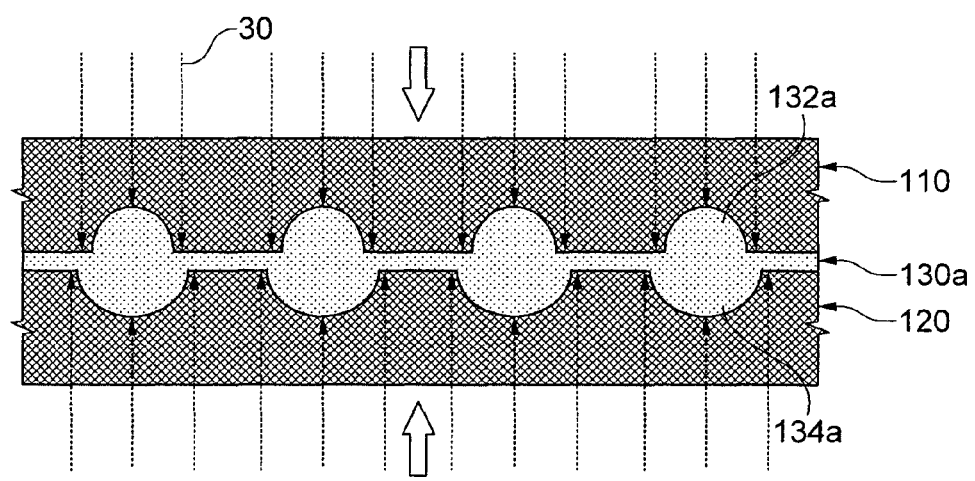
[FIG. 5]
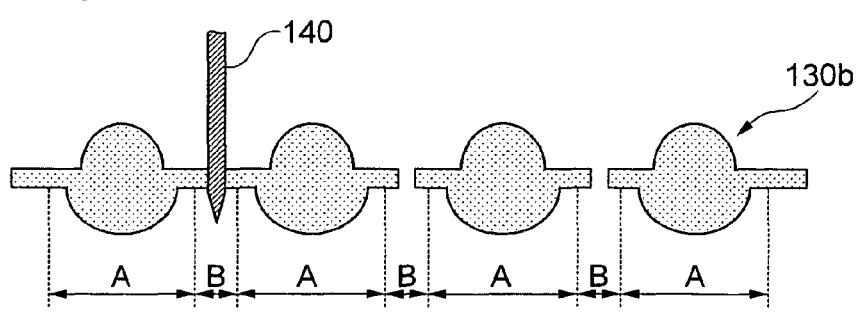

METHOD FOR MANUFACTURING LENS USED IN CAMERA MODULE

CROSS-REFERENCE TO RELATED APPLICATIONS

This application claims the benefit of Korean Patent Application No. 10-2009-0105479 filed with the Korea Intellectual Property Office on Nov. 3, 2009, the disclosure of which is incorporated herein by reference.

BACKGROUND OF THE INVENTION

1. Field of the Invention

The present invention relates to a method for manufacturing a lens; and more particularly, to a method for manufacturing a lens capable of improving manufacturing efficiency of a lens provided in a camera.

2. Description of the Related Art

As general methods for manufacturing a lens array for a camera module, there are an injection molding method, a mold processing method using a lens preform, a method using a stamp, and so on. Among them, the method using the stamp manufactures an array lens of a double-sided lens shape by preparing the stamp having an engraved lens forming portion, supplying a glass substrate with a liquid resin for manufacturing a lens, and pressing the stamp on the glass substrate to form the resin for manufacturing the lens by the lens forming portion.

However, in case of manufacturing the array lens of the double-sided lens shape by the array lens manufacturing method using the stamp, it is required to perform a lens forming process on each of a front surface and a rear surface of the glass substrate. Accordingly, since a process of pressing the stamp on the glass substrate should be performed at least twice, process time is increased. Further, since the array lens manufacturing method using the stamp manufactures the array lens by using the high-priced glass substrate, manufacturing cost of the array lens is increased.

SUMMARY OF THE INVENTION

The present invention has been proposed in order to solve the above-described problems, and it is, therefore, an object of the present invention to provide a method for manufacturing a lens used in a camera module capable of increasing production yield by reducing process time.

Further, another object of the present invention is to provide a method for manufacturing a lens used in a camera module capable of improving manufacturing efficiency by simplifying a manufacturing process.

Further, still another object of the present invention is to provide a method for manufacturing a lens used in a camera module capable of reducing manufacturing cost.

In accordance with an aspect of the present invention to achieve the object, there is provided a method for manufacturing a lens used in a camera module including the step of: preparing a preform for manufacturing a lens; forming a front lens on a front surface of the preform; and forming an array lens by forming a rear lens on a rear surface of the preform during the formation of the front lens.

In accordance with an embodiment of the present invention, the step of forming the front lens may include the steps of preparing a first stamp having a front lens forming portion of a shape corresponding to that of the front lens and pressing the first stamp on the front surface of the preform in a state in which the front lens forming portion faces the front surface of the preform, and the step of forming the rear lens may include the steps of preparing a second stamp having a rear lens forming portion of a shape corresponding to that of the rear lens and pressing the second stamp on the rear surface of the preform in a state in which the rear lens forming portion faces the rear surface of the preform.

In accordance with an embodiment of the present invention, the step of preparing the first stamp may include the steps of preparing a first plate having light transmittance, preparing a first master having a first lens surface processing portion of a shape corresponding to that of the front lens, and pressing the first master on the first plate in a state in which the first lens surface processing portion faces the first stamp, and the step of preparing the second stamp may include the steps of preparing a second plate having light transmittance, preparing a second master having a second lens surface processing portion of a shape corresponding to that of the rear lens, and pressing the second master on the second plate in a state in which the second lens surface processing portion faces the second stamp.

In accordance with an embodiment of the present invention, the method may further include the step of irradiating light to the preform through the first stamp and the second stamp.

In accordance with an embodiment of the present invention, the method may further include the step of providing heat to the preform.

In accordance with an embodiment of the present invention, the method may further include the step of forming a unit lens having the front lens and the rear lens by cutting the array lens.

In accordance with an embodiment of the present invention, the front lens may have a curvature different from that of the rear lens.

In accordance with an embodiment of the present invention, the preform may have a plate shape.

In accordance with an embodiment of the present invention, the preform may be a liquid polymer.

In accordance with an embodiment of the present invention, the step of preparing the preform for manufacturing the lens may include the steps of forming a preliminary front lens portion of a shape corresponding to that of the front lens, on a front surface of a material for manufacturing a lens and forming a preliminary rear lens portion of a shape corresponding to that of the rear lens, on a rear surface of the material for manufacturing the lens.

In accordance with an embodiment of the present invention, the preliminary front lens portion may be integrally formed with the preliminary rear lens forming portion.

In accordance with another aspect of the present invention to achieve the object, there is provided a method for manufacturing a lens used in a camera module including the steps of: preparing a first stamp having a front lens forming portion; preparing a second stamp having a rear lens forming portion; positioning the first stamp and the second stamp so that the front lens forming portion and the rear lens forming portion face each other; providing a material for manufacturing a lens between the first stamp and the second stamp; manufacturing an array lens by pressing the first stamp and the second stamp on the material for manufacturing the lens to form lenses on both surfaces of the material for manufacturing the lens; and manufacturing a unit lens by cutting the array lens.

In accordance with an embodiment of the present invention, the step of providing the material for manufacturing the lens may include the steps of preparing a preform having a preliminary front lens portion of a shape corresponding to that of the front lens forming portion and a preliminary rear lens portion of a shape corresponding to that of the rear lens forming portion and disposing the preform so that the front lens forming portion and the rear lens forming portion are respectively aligned with the preliminary front lens portion and the preliminary rear lens portion.

In accordance with an embodiment of the present invention, the step of preparing the first stamp may include the steps of preparing a first plate having light transmittance, preparing a first mold having a first lens surface processing portion of a shape corresponding to that of the front lens forming portion, and pressing the first mold on the first plate in a state in which the first lens surface processing portion faces the first plate, and the step of preparing the second stamp may include the steps of preparing a second plate having light transmittance, preparing a second mold having a second lens surface processing portion of a shape corresponding to that of the rear lens forming portion, and pressing the second mold on the second plate in a state in which the second lens surface processing portion faces the second plate.

In accordance with an embodiment of the present invention, a curvature size of the first lens surface processing portion may be different from a curvature size of the second lens surface processing portion.

In accordance with an embodiment of the present invention, the array lens may include a lens region which is composed of a front lens and a rear lens opposite to the front lens and a scribe region which is a region other than the lens region, and the step of manufacturing the unit lens may include the step of cutting the scribe region.

In accordance with an embodiment of the present invention, the preliminary front lens portion may be integrally formed with the preliminary rear lens portion.

In accordance with an embodiment of the present invention, the step of preparing the material for manufacturing the lens may include the step of preparing a preform having a plate shape.

In accordance with an embodiment of the present invention, the step of preparing the material for manufacturing the lens may include the step of preparing a preform made of a liquid polymer.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a flow chart showing a method for manufacturing a lens in accordance with an embodiment of the present invention; and FIGS. 2 to 5 are views for describing a manufacturing process of a lens in accordance with an embodiment of the present invention.

DETAILED DESCRIPTION OF THE PREFERRED EMBODIMENTS

The advantages and characteristics of the present invention and methods of achieving them will be apparent with reference to the following embodiments described in detail in conjunction with the accompanying drawings. However, the present invention is not limited to the following embodiments but may be embodied in various other forms. The embodiments are provided to complete the disclosure of the present invention and to completely inform a person with average knowledge in the art of the scope of the present invention. Like reference numerals refer to like elements throughout.

The terms used in the present specification are merely used to describe the embodiments and are not intended to limit the present invention. In the present specification, a singular form includes a plural form as long as not stated otherwise in related descriptions. The terms "comprise" and/or "comprising" do not exclude the existence or addition of one or more different components, steps, operations, and/or elements.

In addition, the embodiments described in the present specification will be described with reference to the plan views and/or the cross-sectional views which are the ideal illustrative views of the present invention. In the drawings, the thickness of films and regions may be exaggerated for clarity. Accordingly, the illustrative view may be changed by, for example, a manufacturing technique and/or an allowable error. Therefore, the embodiments of the present invention are not limited to the shown specific form, but include the changes of the form produced in accordance with the manufacturing process. For example, an etching region shown perpendicularly may be rounded and in a form having a predetermined curvature. Accordingly, the regions illustrated in the drawings are schematic, and while the shape of the regions illustrated in the drawings may illustrate a specific form of the element region, it is not intended to limit the scope of the invention.

FIG. 1 is a flow chart showing a method for manufacturing a lens used in a camera module, and FIGS. 2 to 5 are views for describing a manufacturing process of a lens used in a camera module.

Referring to FIGS. 1 and 2, a first stamp 110 and a second stamp 120 for manufacturing an array lens are prepared (S110). The first stamp 110 forms a front lens of the array lens, and the second stamp 120 forms a rear lens of the array lens. The first stamp 110 has a front lens forming portion 114 of a shape corresponding to that of the front lens, and the second stamp 120 has a rear lens forming portion 124 of a shape corresponding to that of the rear lens. As shown in FIG. 2, the front and rear lens forming portions 114 and 124 have a concave shape toward the outside. In this case, the front and rear lens forming portions 114 and 124 form convex lenses on the array lens. As another example, in case that the front lens and the rear lens are concave lenses, the front and rear lens forming portions 114 and 124 may have a convex shape toward the front lens and the rear lens. As still another example, one of the front and rear lens forming portions 114 and 124 may be provided to form a convex lens, and the other may be provided to form a concave lens.

The step of preparing the first stamp 110 includes the steps of preparing a first plate 112 and a first master 10 and forming the front lens forming portion 114 in the first plate 112 by the first master 10. The step of preparing the first plate 112 includes the step of preparing a plate made of a light transmitting material. As one example, a glass plate may be used as the first plate 112. A first lens surface processing portion 12 of a shape corresponding to that of the front lens forming portion 114 is formed on one surface of the first master 10. And, the first master 10 is pressed on the first plate 112 in a state in which the first lens surface processing portion 12 faces the first plate 112. Accordingly, the first stamp 110 having the front lens forming portion 114 is manufactured. Meanwhile, the step of preparing the second stamp 120 is substantially similar to the step of preparing the first stamp 110 described above. For example, the second stamp 120 is formed by pressing a second master 20 having a second lens surface processing portion 22 on a second plate 122 having light transmittance. Accordingly, the rear lens forming portion 124 is formed on one surface of the second stamp 120.

Referring to FIGS. 1 and 3, a material 130 for manufacturing a lens is provided between the first stamp 110 and the second stamp 120 (S120). For example, the first stamp 110 and the second stamp 120 are disposed so that the front lens forming portion 114 and the rear lens forming portion 124 are vertically aligned with each other. And, the material 130 for manufacturing the lens is positioned between the first stamp 110 and the second stamp 120. The material 130 for manufacturing the lens is made of at least one of a photocurable material and a thermosetting material. For example, the material 130 for manufacturing the lens may be made of a resin material. Here, the material 130 for manufacturing the lens is provided in the form of a lens preform having a shape similar to that of the array lens to be manufactured. In this case, a preliminary front lens portion 132 of a shape substantially similar to that of the front lens forming portion 114 of the first stamp 110 is formed on a front surface of the material 130 for manufacturing the lens, and a preliminary rear lens portion 134 of a shape substantially similar to that of the rear lens forming portion 124 of the second stamp 120 is formed on a rear surface of the material 130 for manufacturing the lens. The preliminary front lens portion 132 and the preliminary rear lens portion 134 have different curvatures. Or, the preliminary front lens portion 132 and the preliminary rear lens portion 134 selectively have different curvatures. The preliminary front lens portion 132 and the preliminary rear lens portion 134 of the material 130 for manufacturing the lens are integrally formed with each other without a boundary surface therebetween.

Meanwhile, although the above-described embodiment describes an example in which the material 130 for manufacturing the lens is provided in the form of the lens preform having the shape of the lens array to be manufactured, the material 130 for manufacturing the lens may use various forms of materials. For example, the material 130 for manufacturing the lens may be provided in a liquid state to be supplied to the second stamp 120 disposed in a relatively low position. For example, the material 130 for manufacturing the lens may be a preform made of a liquid polymer. Or, the material 130 for manufacturing the lens may be provided in the form of a lens preform without the preliminary front and rear lens portions 132 and 134. For example, the material 130 for manufacturing the lens may be a preform having a plate shape.

Referring to FIGS. 1 and 4, lenses are formed on both surfaces of the material 130 for manufacturing the lens by closely adhering the first stamp 110 and the second stamp 120 (S130). For example, a front lens 132a is formed on the front surface of the material 130 for manufacturing the lens by pressing the first stamp 110 on the front surface of the material 130 for manufacturing the lens. In addition, a rear lens 134a is formed on the rear surface of the material 130 for manufacturing the lens by pressing the second stamp 120 on the rear surface of the material 130 for manufacturing the lens during the formation of the front lens 132a. The front lens 132a and the rear lens 134a are formed at the same time. Accordingly, an array lens 130a having the front lens 132a and the rear lens 134a is manufactured. In a process of forming the array lens 130a, the step of irradiating light 30 to the material 130 for manufacturing the lens through the first stamp 110 and the second stamp 120 may be further added. In addition, the step of heating the material 130 for manufacturing the lens may be further added in the process of forming the array lens 130a.

Meanwhile, in a process of processing the material 130 for manufacturing the lens with the first and second stamps 110 and 120, it is possible to improve manufacturing efficiency of the array lens 130a by the shape of the material 130 for manufacturing the lens. More specifically, the material 130 for manufacturing the lens has the preliminary front lens portion 132 of FIG. 3 of the shape substantially similar to that of the front lens forming portion 114 and the preliminary rear lens portion 134 of FIG. 3 of the shape substantially similar to that of the rear lens forming portion 124. Accordingly, when the first and second stamps 110 and 120 press the material 130 for manufacturing the lens, the preliminary front lens portion 132 and the preliminary rear lens portion 134 are easily processed into the front lens 132a and the rear lens 134a having required curvatures.

Referring to FIGS. 1 and 5, a unit lens 130b is formed by cutting the array lens 130a of FIG. 4 (S140). For example, the array lens 130a includes a lens region A in which the front lens 132a and the rear lens 134a are formed and a scribe region B which is a region other than the lens region A. The scribe region B is a region for cutting the array lens 130a into the unit lens. Therefore, the unit lens 130b for a camera module is manufactured by cutting the array lens 130a along the scribe region B with a predetermined cutting device 140. Meanwhile, the unit lens 130b has a rectangular shape as seen from a plane. For this, the scribe region B is provided in a substantially rectangular shape.

As described above, the method for manufacturing the lens used in the camera module in accordance with the present invention manufactures the array lens 130a by simultaneously forming the front lens 132a and the rear lens 134a on the material 130 for manufacturing the lens through the first and second stamps 110 and 120. Accordingly, the method for manufacturing the lens used in the camera module in accordance with the present invention can reduce lens manufacturing process time in comparison with a case in which the front lens and the rear lens of the array lens are respectively formed by separate processes.

Further, the method for manufacturing the lens used in the camera module in accordance with the present invention manufactures the array lens 130a with the first and second stamps 110 and 120 by using the material 130 for manufacturing the lens of the preform shape. Accordingly, the method for manufacturing the lens used in the camera module in accordance with the present invention can reduce lens manufacturing cost without a separate glass substrate for manufacturing the array lens.

The method for manufacturing the lens used in the camera module in accordance with the present invention forms the lenses on the front surface and the rear surface of the material for manufacturing the lens by using the first stamp and the second stamp. Accordingly, the method for manufacturing the lens used in the camera module in accordance with the present invention can increase production yield of the lens manufacturing process by reducing the lens manufacturing process time. In addition, the method for manufacturing the lens used in the camera module in accordance with the present invention can improve manufacturing process efficiency by simplifying a manufacturing process.

The method for manufacturing the lens used in the camera module in accordance with the present invention forms the array lens with the first stamp and the second stamp by using the material for manufacturing the lens of the preform shape. Accordingly, the method for manufacturing the lens used in the camera module in accordance with the present invention can reduce the lens manufacturing cost without the separate glass substrate for manufacturing the array lens.

The foregoing description illustrates the present invention. Additionally, the foregoing description shows and explains only the preferred embodiments of the present invention, but it is to be understood that the present invention is capable of use in various other combinations, modifications, and environments and is capable of changes and modifications within the scope of the inventive concept as expressed herein, commensurate with the above teachings and/or the skill or knowledge of the related art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method for manufacturing a lens used in a camera module comprising:
    preparing a preform for manufacturing a lens;
    forming front lenses on a front surface of the preform; and
    forming an array lens by forming rear lenses on a rear surface of the preform during the formation of the front lenses,
    wherein preparing the preform for manufacturing the lens comprises forming a preliminary front lens portion of a shape corresponding to that of the front lenses, on a front surface of a material for manufacturing a lens, and forming a preliminary rear lens portion of a shape corresponding to that of the rear lenses, on a rear surface of the material for manufacturing the lens,
    wherein forming the front lenses comprises preparing a first stamp having a front lens forming portion of a shape corresponding to that of the front lenses, and pressing the first stamp on the front surface of the preform in a state in which the front lens forming portion faces the front surface of the preform, and
    wherein forming the rear lenses comprises preparing a second stamp having a rear lens forming portion of a shape corresponding to that of the rear lenses, and pressing the second stamp on the rear surface of the preform in a state in which the rear lens forming portion faces the rear surface of the preform.

2. The method according to claim 1, wherein preparing the first stamp comprises:
    preparing a first plate having light transmittance;
    preparing a first master having a first lens surface processing portion of a shape corresponding to that of the front lenses; and
    pressing the first master on the first plate in a state in which the first lens surface processing portion faces the first stamp, and preparing the second stamp comprises:
    preparing a second plate having light transmittance;
    preparing a second master having a second lens surface processing portion of a shape corresponding to that of the rear lenses; and
    pressing the second master on the second plate in a state in which the second lens surface processing portion faces the second stamp.

3. The method according to claim 1, further comprising irradiating light to the preform through the first stamp and the second stamp.

4. The method according to claim 1, further comprising providing heat to the preform.

5. The method according to claim 1, further comprising forming a unit lens having a front lens and a rear lens by cutting the array lens.

6. The method according to claim 1, wherein a front lens has a curvature different from that of a rear lens.

7. The method according to claim 1, wherein the preliminary front lens portion is integrally formed with the preliminary rear lens portion.

8. A method for manufacturing a lens used in a camera module comprising:
    preparing a first stamp having a front lens forming portion;
    preparing a second stamp having a rear lens forming portion;
    positioning the first stamp and the second stamp so that the front lens forming portion and the rear lens forming portion face each other;
    providing a material for manufacturing a lens between the first stamp and the second stamp;
    manufacturing an array lens by pressing the first stamp and the second stamp on the material for manufacturing the lens to form a plurality of lenses on both surfaces of the material for manufacturing the lens; and
    manufacturing a unit lens by cutting the array lens,
    wherein providing the material for manufacturing the lens comprises
        preparing a preform having a preliminary front lens portion of a shape corresponding to that of the front lens forming portion and a preliminary rear lens portion of a shape corresponding to that of the rear lens forming portion; and
        disposing the preform so that the front lens forming portion and the rear lens forming portion are respectively aligned with the preliminary front lens portion and the preliminary rear lens portion.

9. The method according to claim 8, wherein the preliminary front lens portion is integrally formed with the preliminary rear lens portion.

10. The method according to claim 8, wherein preparing the first stamp comprises:
    preparing a first plate having light transmittance;
    preparing a first mold having a first lens surface processing portion of a shape corresponding to that of the front lens forming portion; and
    pressing the first mold on the first plate in a state in which the first lens surface processing portion faces the first plate, and preparing the second stamp comprises:
    preparing a second plate having light transmittance;
    preparing a second mold having a second lens surface processing portion of a shape corresponding to that of the rear lens forming portion; and
    pressing the second mold on the second plate in a state in which the second lens surface processing portion faces the second plate.

11. The method according to claim 10, wherein a curvature size of the first lens surface processing portion is different from a curvature size of the second lens surface processing portion.

12. The method according to claim 8, wherein the array lens includes a lens region which is composed of a front lens and a rear lens opposite to the front lens and a scribe region which is a region other than the lens region, and manufacturing the unit lens comprises cutting the scribe region.

* * * * *